Jan. 5, 1937.   R. C. SABINS   2,066,649
FLEXIBLE AIRPLANE WING CONSTRUCTION
Filed Jan. 9, 1935
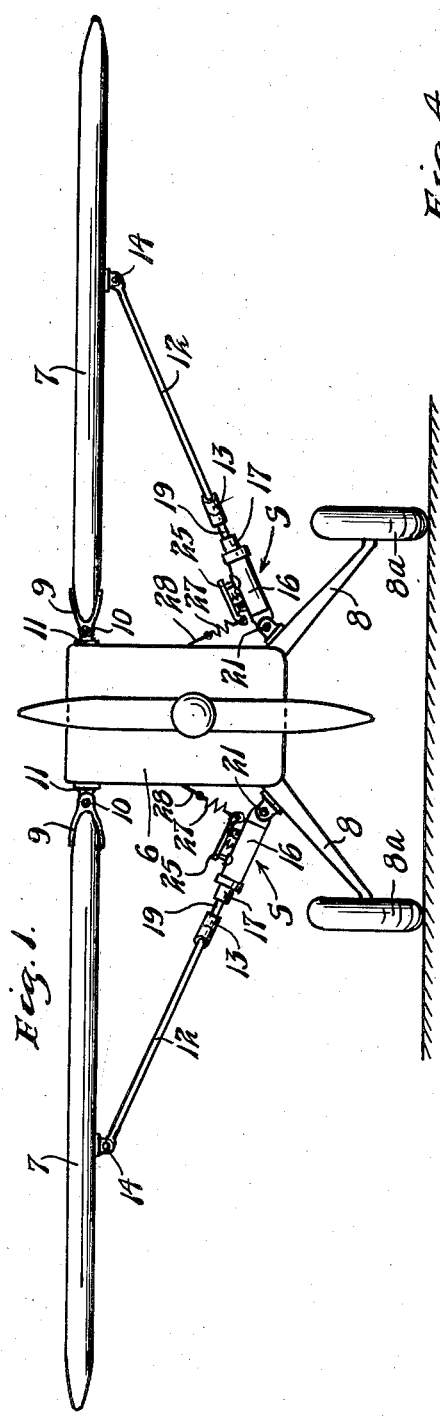
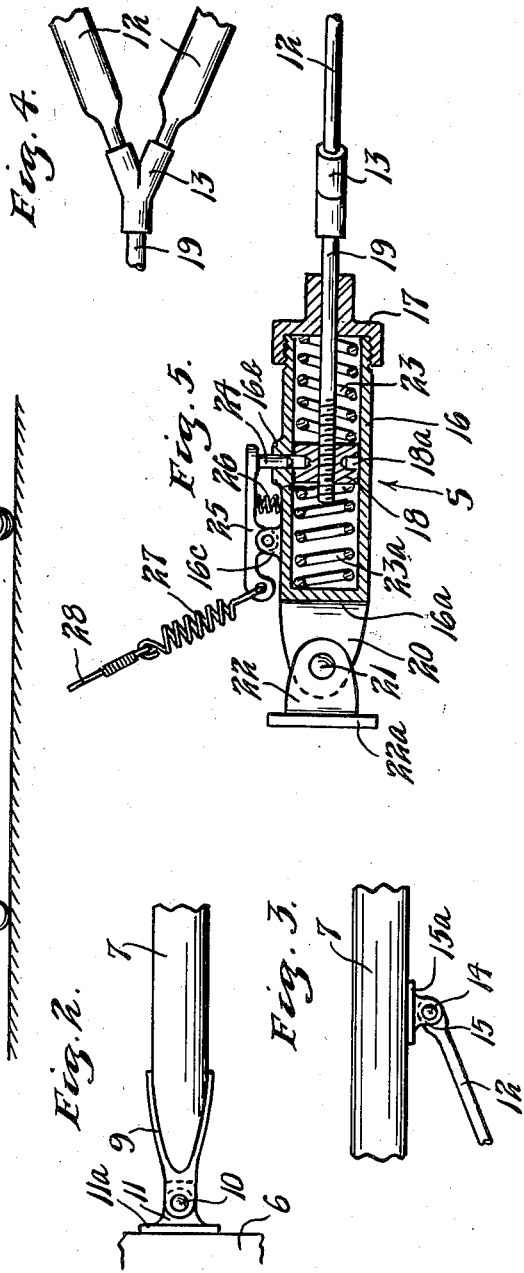
INVENTOR.
ROLLAND C. SABINS.
BY HIS ATTORNEYS.
Williamson & Williamson Patented Jan. 5, 1937

2,066,649

UNITED STATES PATENT OFFICE 2,066,649

FLEXIBLE AIRPLANE WING CONSTRUCTION

Rolland C. Sabins, St. Paul, Minn., assignor to Mechanical Development Co., St. Paul, Minn., a corporation of Minnesota Application January 9, 1935, Serial No. 980

2 Claims. (Cl. 244—38)

My invention relates to airplane structures and particularly to such structures having deflectibly attached wings.

In flight of an airplane through air in which rising and descending columns of air or other disturbances exist many shocks are imposed upon the wings of the airplane and the occupants of the airplane. Such shocks cause large stresses in the airplane structure and discomfort to occupants. In landing of airplanes all landings are not made perfectly and, at times, landings must be made on relatively rough ground with the result that rigidly mounted wings, such as are normally used, are often subjected to considerable shock in making landings.

The general object of my invention is to provide means in an airplane for reducing or absorbing the shocks normally imparted to the wings of the airplane in flight and in landing.

A more specific object is to provide an airplane structure wherein the wings are arranged for deflection upwardly or downwardly from their normal positions relative to the other parts of the structure in response to changes in load on the wings.

Another object is to provide such a structure including means for limiting and yieldably resisting deflection of the wings and urging the wings toward their normal positions.

A further object is to provide an airplane structure having wings deflectible upwardly or downwardly and means bracing said wings against deflection through shock absorbing means.

A still further object is to provide in such a structure releasable means for locking said shock absorbing means when the wings are in normal position.

These and other objects and advantages of the invention will more fully appear from the following description, made in connection with the accompanying drawing, wherein like reference characters refer to the same or similar parts throughout the various views, and in which:—

Fig. 1 is a front view of an airplane having my flexible wing construction incorporated therein;

Fig. 2 is a broken away partial front view on an enlarged scale showing the joint between one of the wings and the fuselage;

Fig. 3 is a broken away partial front view showing the connection of the shock absorbing strut to the wing;

Fig. 4 is a broken away partial top view of the strut, and

Fig. 5 is a partially sectional broken away front view showing the shock absorbing element of the strut and the means for connecting the strut to the fuselage of the airplane.

Referring to the drawing, my flexible wing construction is shown as applied to a high wing monoplane having a fuselage 6, wings 7, landing gear 8 including wheels 8a.

The wings 7 are hingedly connected at their respective inner ends to the fuselage 6 to permit deflection or swinging movement of each wing 7 upwardly or downwardly relative to the fuselage 6. Brackets 9 are secured to the inner end of the wing 7 at the respective locations of the inner ends of the front and rear spars of the wing and are respectively swingably connected by means of pins 10 to lugs 11 carried by plates 11a secured to the upper corner portions of the fuselage 6. The pins 10 are axially aligned to provide for upward and downward deflection of the wings and are widely spaced apart to rigidly restrain the wings from forward or rearward deflection of the wings.

Resilient means is provided to resistingly restrain the wings 7 from upward or downward deflection, to limit deflection of the wings and to urge the wings toward a normal or non-deflected position intermediate of their limits of deflection. A generally V-shaped strut including a pair of divergent combined tension and compression members 12 is disposed in each of two planes respectively extending upwardly and laterally outwardly from the respective lower corners of the fuselage 6 to the medial portions of corresponding ones of the wings 7. The members 12 of each V-strut are secured to and joined together by a Y-shaped fitting 13 located at the vertex of the V. The free end of each of the members 12 of each of the V-shaped struts is swingably connected to the medial portion of one of the wings by means of a pin 14 extending through said free end and through a lug 15 carried by a plate 15a which is secured to the wing 7. The two plates 15a associated with each wing 7 are located at and secured to the front and rear spars respectively of that wing.

The Y-shaped fitting 13 at the vertex of each V-shaped strut is connected to the lower corner of the fuselage 6 through two-way shock absorbing means S. Each shock absorbing means S includes a cylindrical casing 16 provided with a permanent closure wall 16a at its lower end and having an axially apertured, concentrically bossed cap 17 screw-threadedly secured on its upper end. A plunger 18, medially located in and slidable longitudinally of the casing 16, is screw-threadedly mounted on the inner end of a rod 19 which extends outwardly of the casing 16 through the aperture in the cap 17 and is rigidly secured at its outer end to the Y-shaped fitting 13.

A lug 20 formed on the lower end of the casing 16 is connected by means of a pin 21 to a lug 22 carried by a plate 22a which is secured to the lower corner portion of the fuselage 6.

Helical compression springs 23 and 23a, disposed in the interior of the casing 16 at opposite sides of the plunger 18, as shown, both bear against the plunger 18 at their respective inner ends and respectively bear against the cap 17 and the closure wall 16a at their outer ends. The springs 23 and 23a obviously yieldingly urge the plunger 18 toward a normal position intermediate of its limits of movement.

Means is provided for locking the plunger 18 of the shock-absorbing means S in its normal or intermediate position. A bossed portion 16b of the medial portion of the upper side of the casing 16 is apertured and a locking pin 24 is disposed in the aperture thereof for longitudinal movement radially of the casing 16. The plunger 18 is provided with an annular groove 18a in the peripheral portion thereof for receiving the inner end of the locking pin 24. A double armed lever 25 is swingably mounted on a lug 16c formed on the upper side of the casing 16 and is attached at the free end of the outwardly extending arm thereof to the outer end of the stop pin 24. A stop pin retracting spring 26 of the helical compression type is placed between the outwardly extending arm of the lever 25 and the upper side of the casing 16. A helical tension spring 27 is connected to the free end of the inwardly extending arm of the lever 25 and an operating cable 28 is connected at its lower end to the upper end of the tension spring 27. The upper end of the cable 28 is located in a position readily accessible to a pilot of the airplane and, if desired, may be connected to a suitable actuating element.

It should be apparent from the above description that upward or downward force applied to the wings of an airplane embodying the principle of my invention will result in corresponding deflection of the wings by such force, rather than the wings rigidly opposing that force, and that deflection of the wings is resiliently resisted by the shock-absorbing means and is limited in extent by the shock absorbing means.

The stop pins of the shock-absorbing units are normally maintained in retracted or non-locking position so as to permit free action of the shock-absorbing units. As the airplane in flight encounters currents in the air the fuselage and its occupants are not subjected to the jolts experienced in conventionally constructed airplanes and the structure of the airplane is not subjected to the usual shock stresses.

If a wing of the airplane encounters an upwardly moving column of air the spring 23 of the shock-absorbing device will be compressed by the plunger 18 to absorb the shock and permit the wing to swing upwardly. The compressed spring 23 will then urge the plunger 18 toward its normal position intermediate of the ends of the casing 16 so as to return the wing to its normal position. Encountering a downwardly moving column of air will cause action of spring 23a in a manner similar to that described above in connection with spring 23. The shocks ordinarily imparted to the wings by poorly made landings or landings made on rough ground will obviously be absorbed or greatly reduced by the shock-absorbing deflectible wing construction disclosed.

The degree to which the wings 7 may be deflected is limited by the springs 23 and 23a becoming fully compressed and, when full compression has been attained, no further deflection can take place even though one of the springs has become broken.

The absorption of shocks by the structure described above enables the use of lighter wing construction without sacrificing dependability of the airplane structure and with retention of the usual margin of safety relative to the actual stresses imposed upon the members comprising the structure. Lightening of the wing construction obviously reduces the cost of the airplane and makes greater speed and/or greater pay load capacity available without increase in engine horsepower.

If it is desired at any time to secure the wings of the airplane in their normal or non-deflected position, the control cable 28 may be placed under tension to engage the stop pin 24 in the groove 18a of the plunger 18 to lock the plunger 18 in an intermediate position and thus render the shock-absorbing means S inoperative.

While my invention is described and illustrated as applied to a high wing type of monoplane, it is apparent that the principle of my invention may be applied to various types of airplane structures. Also various types of shock absorbing means and various means for rendering airplane wings deflectable may be employed in applying the principle of my invention to an airplane structure.

It is apparent that I have invented novel, simple and inexpensive means for absorbing shocks normally imposed upon airplane wings and transmitted therefrom to the fuselage and occupants of the airplane.

It will, of course, be understood that various changes may be made in the form, details, proportions and arrangement of the parts without departing from the scope of my invention, which, generally stated, consists in a device capable of carrying out the objects above set forth and in the novel parts and combinations of parts disclosed and defined in the appended claims.

What is claimed is:—

1. In an airplane structure, wings arranged to permit vertical deflection thereof from their normal positions relative to the remainder of said structure, means yieldingly urging said wings toward their normal positions and releasable means for locking said wings in their normal positions.

2. The structure defined in claim 1 and a control element accessible to a pilot of said airplane and connected to said releasable locking means for setting and releasing the same.

ROLLAND C. SABINS.